(12) United States Patent
Liu et al.

(10) Patent No.: US 10,309,727 B2
(45) Date of Patent: Jun. 4, 2019

(54) MULTI-STAGE CIRCULATING FLUIDIZED BED SYNGAS COOLING

(71) Applicant: Southern Company, Birmingham, AL (US)

(72) Inventors: Guohai Liu, Birmingham, AL (US); Pannalal Vimalchand, Birmingham, AL (US); Xiaofeng Guan, Birmingham, AL (US); WanWang Peng, Birmingham, AL (US)

(73) Assignee: Southern Company, Birmingham, AL (US)

( * ) Notice: Subject to any disclaimer, the term of this patent is extended or adjusted under 35 U.S.C. 154(b) by 347 days.

(21) Appl. No.: 15/272,667

(22) Filed: Sep. 22, 2016

(65) Prior Publication Data
US 2017/0038152 A1  Feb. 9, 2017

Related U.S. Application Data

(62) Division of application No. 14/010,381, filed on Aug. 26, 2013, now Pat. No. 9,464,848.

(Continued)

(51) Int. Cl.
*F28D 13/00* (2006.01)
*C10J 3/86* (2006.01)
(Continued)

(52) U.S. Cl.
CPC ............... *F28D 13/00* (2013.01); *C10J 3/86* (2013.01); *C10K 3/005* (2013.01); *F28D 15/00* (2013.01);
(Continued)

(58) Field of Classification Search
CPC .. F23C 10/10; F23C 2206/103; F23C 10/005; B01J 8/388; B01J 2208/00548; B01J 8/28; B01J 8/0055; B01J 8/1872; B01J 8/26
See application file for complete search history.

(56) References Cited

U.S. PATENT DOCUMENTS 4,026,357 A    5/1977  Redford
4,158,036 A *  6/1979  Jaffe ...................... B01J 8/1836
                                                        165/104.16
(Continued)

FOREIGN PATENT DOCUMENTS

CN      103826737 A     5/2014
EP        0700866 A1    3/1996
(Continued)

OTHER PUBLICATIONS

Third Examination Report in related Pakistani Patent Application No. 571/2013, dated Oct. 25, 2016.
(Continued)

*Primary Examiner* — Imran Akram
(74) *Attorney, Agent, or Firm* — Troutman Sanders LLP; Ryan A. Schneider

(57) ABSTRACT

A method and apparatus for cooling hot gas streams in the temperature range 800° C. to 1600° C. using multi-stage circulating fluid bed (CFB) coolers is disclosed. The invention relates to cooling the hot syngas from coal gasifiers in which the hot syngas entrains substances that foul, erode and corrode heat transfer surfaces upon contact in conventional coolers. The hot syngas is cooled by extracting and indirectly transferring heat to heat transfer surfaces with circulating inert solid particles in CFB syngas coolers. The CFB syngas coolers are staged to facilitate generation of steam at multiple conditions and hot boiler feed water that are necessary for power generation in an IGCC process. The (Continued)

multi-stage syngas cooler can include internally circulating fluid bed coolers, externally circulating fluid bed coolers and hybrid coolers that incorporate features of both internally and externally circulating fluid bed coolers.

19 Claims, 4 Drawing Sheets

Related U.S. Application Data

(60) Provisional application No. 61/693,707, filed on Aug. 27, 2012.

(51) Int. Cl.
  *F28D 21/00* (2006.01)
  *F28D 15/00* (2006.01)
  *C10K 3/00* (2006.01)

(52) U.S. Cl.
  CPC ..... *F28D 21/0001* (2013.01); *C10J 2300/093* (2013.01); *C10J 2300/1884* (2013.01); *C10J 2300/1892* (2013.01); *F28D 2021/0075* (2013.01); *Y02E 20/16* (2013.01); *Y02E 20/18* (2013.01)

(56) References Cited

U.S. PATENT DOCUMENTS

| | | | |
|---|---|---|---|
| 4,412,848 A | 11/1983 | Koyama et al. | |
| 4,473,033 A * | 9/1984 | Strohmeyer, Jr. | F22B 31/0007 110/245 |
| 4,579,070 A | 4/1986 | Lin et al. | |
| 4,709,662 A | 12/1987 | Rawdon | |
| 4,709,663 A * | 12/1987 | Larson | B01J 8/388 110/245 |
| 4,936,872 A | 6/1990 | Brandl et al. | |
| 5,019,137 A | 5/1991 | Ruottu | |
| 5,176,109 A | 1/1993 | Engstrom | |
| 5,218,932 A * | 6/1993 | Abdulally | B01D 45/08 110/245 |
| 5,281,398 A * | 1/1994 | Hyppanen | B01D 45/12 422/146 |
| 5,293,843 A | 3/1994 | Provol et al. | |
| 5,299,532 A | 4/1994 | Dietz | |
| 5,332,553 A * | 7/1994 | Hyppanen | B01J 8/1836 110/245 |
| 5,347,953 A | 9/1994 | Adbulally | |
| 5,426,868 A | 6/1995 | Yamada et al. | |
| 5,463,968 A | 11/1995 | Abdulally | |
| 5,505,907 A * | 4/1996 | Hiltunen | B01J 8/386 122/4 D |
| 5,522,160 A * | 6/1996 | Hyppanen | F22B 31/0084 34/589 |
| 5,567,228 A | 10/1996 | Abdulally | |
| 5,580,241 A | 12/1996 | Koeberle | |
| 5,585,071 A * | 12/1996 | Hyppanen | B01D 45/02 122/4 D |
| 2004/0100902 A1 | 5/2004 | Vimalchand et al. | |
| 2010/0024297 A1 | 2/2010 | Suda et al. | |
| 2011/0146152 A1 | 6/2011 | Vimalchand et al. | |
| 2011/0295049 A1 | 12/2011 | Chewter et al. | |
| 2012/0031584 A1 | 2/2012 | Vimalchand et al. | |
| 2012/0138861 A1 | 6/2012 | Liu | |
| 2012/0216680 A1 * | 8/2012 | Vinnalchand | B01D 53/62 96/242 |
| 2014/0034134 A1 | 2/2014 | Fan et al. | |

FOREIGN PATENT DOCUMENTS

| | | |
|---|---|---|
| JP | 51-127101 A | 11/1976 |
| JP | 57-179289 A | 11/1982 |
| WO | 1996/006901 A1 | 3/1996 |
| WO | 2014035887 A1 | 3/2014 |

OTHER PUBLICATIONS

Patent Examination Report No. 1 in related Australian Patent Application No. 2013309093, dated Nov. 20, 2015.
Patent Examination Report No. 2 in related Australian Patent Application No. 2013309093, dated Feb. 10, 2016.
First Office Action (including English translation) in related Chinese Patent Application No. 201380003161X, dated Feb. 16, 2016.
Extended European Search Report in related European Patent Application No. 13832004.9, dated May 9, 2016.
International Preliminary Report on Patentability (Chapter I of the Patent Cooperation Treaty) from related International Patent Application No. PCT/US2013/056631, dated Mar. 3, 2015.
International Search Report and Written Opinion of the International Searching Authority for related International Patent Application No. PCT/US2013/056631, dated Jan. 30, 2014.
First Examination Report in related Pakistani Patent Application No. 57112013, dated Jan. 1, 2015.
Second Examination Report in related Pakistani Patent Application No. 57112013, dated Nov. 13, 2015.
Search Report and Written Opinion in related Singaporean Patent Application No. 11201408560X, dated Sep. 24, 2015.
Second Office Action (including English translation) in related Chinese Patent Application No. 201380003161X, dated Nov. 22, 2016.
Office Action from related Japanese Patent Application No. 2015-529900, dated Jan. 17, 2017, 7 pages.
Translation of Official Action for Related Application No. OM/P/2015/000049 dated Feb. 24, 2015.

* cited by examiner

MULTI-STAGE CIRCULATING FLUIDIZED BED SYNGAS COOLING

CROSS-REFERENCE TO RELATED APPLICATIONS

This application is a divisional of U.S. application Ser. No. 14/010,381 filed 26 Aug. 2013, which claims the benefit under 35 USC § 119(e) of U.S. Provisional Application No. 61/693,707, filed 27 Aug. 2012, both of which are incorporated by reference in their entirety.

STATEMENT REGARDING FEDERALLY SPONSORED RESEARCH OR DEVELOPMENT

This invention was made with Government support under Agreement/Contract Number DE-NT0000749, awarded by the United States Department of Energy. The Government has certain rights in the invention.

BACKGROUND OF THE INVENTION

1. Field of Invention

The invention relates to a multi-stage circulating fluidized bed (CFB) cooler for cooling a hot gas stream from a reactor while generating both saturated steam and superheated steam. More specifically, the invention is associated with a cooler for cooling the hot syngas from a gasifier handling carbonaceous materials such as coal, biomass or municipal wastes as feed, the cooler simultaneously generates high pressure saturated and superheated steam for power generation. The cooler agglomerates molten ash droplets that are typically present in the syngas generated from a slagging gasifier. The present multi-stage CFB syngas cooler also protects heat transfer surfaces from contacting other fouling, erosive and corrosive substances in the syngas produced by slagging and other types of gasifiers.

2. Background of Art

For those of skill in the art of syngas cooling, difficulties of cooling syngas when directly contacting syngas with the heat transfer surfaces are well-known, and include: plugging the gas flow path due to entrained substances in the syngas, fouling of the heat transfer surfaces due both to deposition of fine molten ash droplets and to tar components in the syngas, erosion due to fine ash and char entrained from the gasifier, and corrosion due to components in the syngas such as hydrogen sulfide and chloride.

Another difficulty associated with syngas cooling is identifying and handling materials of construction for heat transfer surfaces that are compatible with high temperatures and protecting relatively expensive heat transfer surfaces for reliable operation.

At present, options attempting to circumvent the many difficulties of reliably cooling syngas greatly sacrifice process efficiencies. For example, to stay within temperature limits of materials of construction of a conventional convective syngas cooler, the gasifier exit stream must be initially cooled by mixing with large amounts of relatively cooler recycle gas. Other examples of sacrificed process efficiencies in order to accommodate existing syngas coolers include upstream quench cooling, injecting coal in upper portions of the gasifier to lower gasifier exit temperatures, and operating the gasifier at lower temperatures with the attendant lower carbon conversion.

U.S. Pat. No. 8,197,564 discloses an example of quench cooling the syngas downstream of an entrained flow gasifier and radiant syngas cooler to limit downstream plugging and fouling problems normally associated with fine ash and slag that are separated from the gas stream either by precipitating or by surface cooling with direct contact with water. Such quench cooling systems involve an expensive radiant syngas cooler and less-than-reliable water treatment systems to separate particles and treat water as the spent quench water, which is highly corrosive and erosive in nature, increasing overall costs to cool the syngas. In addition, practical experience indicates that the combination of radiant and quench cooling of syngas is not completely effective in limiting (avoiding) plugging problems of a downstream convective cooler.

Syngas generated from fluidized bed gasifiers exits the gasifiers at relatively lower temperatures (approximately 1000° C.) as compared to entrained flow gasifiers. Even then, a syngas cooler to cool the syngas exiting such gasifiers is a relatively expensive piece of equipment due to the use of exotic alloys for the cooling tubes. In a conventional convective cooler that contact the syngas near 1000° C. under high pressure conditions such exotic and expensive alloys must be used. A further difficulty in cooling the syngas from fluidized bed gasifiers is the fine ash and char particles entrained therein that tend to erode the cooling tube surfaces. Deposition and fouling gradually degrades the cooling effectiveness and results in less than desirable superheated steam conditions, affecting generation capacity in an integrated gasification combined cycle (IGCC) plant. To deal with these difficulties and inlet syngas cooler conditions, thick-wall designs comprising exotic alloys have to be used for cooler heat transfer surface materials of construction.

Syngas coolers have limited cooling capacities due to internal hydrodynamics, pressure drop and other process considerations that limit its physical dimensions. In some applications such as in an IGCC process of a nominal 300 MWe capacity, cooling the syngas from a single gasifier requires multiple syngas coolers in parallel. Multiple, parallel syngas coolers in a process line inevitably increase both the costs and layout complexities in handling high pressure syngas near 1000° C.

Processing biomass and bituminous coals in some fluidized bed gasifiers lead to tar formation that entrains with the syngas as it exits the gasifier. The tar components deposit on syngas cooler heat transfer surfaces and downstream equipment and the deteriorating foul conditions eventually lead to an inoperable process. Similar difficulties are encountered while processing coals that contain higher percentage of alkali metals in coal minerals. Even at increased costs and overall decreases in process efficiencies, conventional syngas coolers still cannot be reliably used for these processes with known mitigating measures upstream.

U.S. Pat. No. 4,412,848 discloses a method to cool syngas in a two-stage fluidized bed cooling system. The first-stage fluidized bed cooler operates in the temperature range of 450-500° C. in an attempt to minimize tar condensation on the surface of the inert bed material particles. The second-stage cooler operates in the temperature range of 250-300° C. in an attempt to allow liquid condensation onto the particle surfaces. To avoid solidified condensate accumulation on the surface of the particles, oxygen and steam are injected into the second-stage cooler to burn off the condensate or char on the particle surfaces. This two-stage fluidized bed cooling system advances the art of syngas cooling compared with many other types of heat exchangers for similar applications when the syngas contains condensable liquids or char. It can also generate moderate temperature and high pressure steam to improve the overall process efficiency if the steam is used for power generation. Yet the '848 two-stage fluidized bed cooling system encounters practical difficulties.

One notable disadvantage relates to the substantial amount of oily matter contained in the syngas exiting the cooler that makes it difficult and expensive to treat the sour water that is generated from scrubbing the syngas downstream. Another serious issue is safety—as disclosed, the operating temperature of the second-stage cooler is substantially below the auto ignition temperatures of major components of the syngas such as carbon monoxide (609° C.), hydrogen (500° C.) and methane (580° C.). The operating temperature of 400-500° C. in the combustion zone of the second-stage cooler is lower than the auto ignition temperature of syngas components. Those of skill in the art fully appreciate the danger or increased potential for explosion when injecting oxygen into a syngas stream whose temperature is below the auto ignition temperature. Beyond such safety concerns, the low temperature partial oxidation method necessitates a much larger space for the cooler for a combustion zone and generates much more $CO_2$ than CO.

The cooling capacity of the '848 cooler is also disadvantageous. In a bubbling or spouted bed cooler, the gas superficial velocity is generally below 1 meter per second (m/s). As a result, when large amounts of syngas from a typical IGCC plant needs to be cooled, at least two syngas coolers in parallel are required to avoid the cooler diameter from being above normal transportation limits. Yet parallel cooler arrangements are expensive because the syngas has to be routed to the coolers by refractory lined pipes.

U.S. Pat. No. 5,759,495 discloses a method and apparatus for treating hot gases including syngas in a circulating fluidized bed. It teaches that the gas is sufficiently cooled before it contacts the cooling surface, alleging that erosion of cooling surface in the riser will not be an issue. Yes this teaching oversimplifies a complicated issue. When the cooling surface is in the direct flow path of the riser, where gas superficial velocity is typically above 5 m/s, the erosion of even a cooler cooling surface is inevitable. It is therefore impractical to install the cooling surface inside the riser. Even if not implausible, operating the cooler at such low temperatures generates low grade steam, which is of much less use in a power plant environment. Furthermore, the '495 Patent is silent on how to handle the solids and/or liquid condensate accumulation on the cooler and particle surfaces.

Another internally circulating fluidized bed syngas cooler is disclosed in U.S. Patent Publication No. 2004/0100902. Beneficially, the gas superficial velocity in the disclosed cooler can be operated in the range of 5-10 m/s so that one cooler can handle up to a volume of 90 actual cubic meters per second ($m^3$/s), which relates to a capacity larger than known commercial gasifiers. Although the teaching in this Publication can have wide applications for treating syngas, it too does not disclose how to avoid contaminant accumulations on the particle surfaces and regeneration of bed materials from such contaminants. Furthermore, the Publication discloses a single-stage cooler that does not address the steam conditions necessary for power generation.

To overcome the operability, efficiency and cost issues mentioned above, an improved syngas cooler is highly desirable. It is the intention of the present invention to provide for such an industrial need.

BRIEF SUMMARY OF THE INVENTION

Briefly described, in a preferred form, the present invention comprises a CFB syngas cooler. Circulating heat transfer media extracts heat from the syngas and subsequently transfers it to a heat removal mechanism (heat transfer surfaces), resulting in cooler syngas. In preferred embodiments, the heat transfer media comprises circulating solids, although other/additional phases of media can be used.

The cooling sequence includes contacting the circulating solids with the hot syngas and, after the syngas and circulating solids disengage, then the hot circulating solids transfer heat to the heat removal mechanism as the circulating solids move around the circulating loop. The heat removal mechanism can comprise heat transfer tubes or coils having heat transfer surfaces, where steam can be generated or saturated steam can be superheated while the circulating solids in contact with the heat transfer surfaces are being cooled via heat transfer.

In another aspect of the present invention, the CFB syngas cooler includes multiple stages of syngas cooling to raise steam at different conditions. Syngas is fed to the bottom of a riser of the present CFB syngas cooler, and the heated circulating solids are withdrawn from different elevations of the riser by gravity. The heated circulating solids exiting the riser at a certain elevation flows into a solids cooler in which installed tube bundles or heat transfer coils cool the circulating solids to a desired temperature via heat transfer. Boiler feed water or saturated steam is fed to the heat transfer surfaces for steam generation or to generate superheated steam.

In yet another aspect of the invention, the present CFB syngas cooler includes a downward flow stage to cool the hot syngas to a desired temperature and agglomerate fine molten ash droplets and other fouling substances in the gas phase. The hot syngas exchanges heat with circulating cooler solids as both syngas and circulating cooler solids flow concurrently in the downward flow stage of the cooler. The syngas reaching the fluidized bed cooler has minimal, if any, fouling materials, and thus eliminates deposition problems.

In still another aspect of the present invention, organic compounds that can be condensed such as tar and other light components are destructed in a high temperature region at the inlet of the cooler. The temperatures at the inlet of the cooler are much higher than auto ignition temperatures of syngas components, alleviating a major explosion safety concern. Also, such high temperature partial oxidation beneficially increases the CO fraction in the syngas.

In still another aspect of the present invention, the CFB syngas cooler can have multiple stages. For example, one stage of the cooler can be dedicated as steam generator, another stage as a steam superheater and reheater, and yet another stage as an economizer. The syngas is thus successively cooled to progressively lower temperatures by transferring heat to the circulating bed of solids in each stage.

In another aspect of the present CFB syngas cooler, warm syngas clean-up can be accomplished by incorporating regenerable sorbents in one or more appropriate stages of the cooler depending upon operating temperature ranges of the selected sorbents. Warm syngas clean-up sorbents are being developed for desulfurization and to capture trace components such as mercury, arsenic, cadmium and lead. Either the sorbents by themselves, or a mixture of sorbents and inert circulating solids, can be used as circulating heat transfer media to accomplish both syngas cooling and clean-up.

The syngas from a fluidized bed gasifier can contain substantial char particles. As the char particles are porous and much lighter in density, the present invention can further comprise a syngas cooler gas-solid disengagement unit and the particle collection system being optimized such that minimal-to-no char particles will accumulate in the gas cooler.

In another aspect of the present invention, a dense fluidized bed with imbedded cooling coils at the inlet of the CFB syngas cooler ensures sufficiently low syngas cooler exit temperatures for necessary time periods in case operational difficulties prevent substantial solids circulation in other downstream stages of the cooler.

In exemplary embodiments, the present invention comprises a multistage circulating fluidized bed syngas cooler to cool high temperature syngas containing entrained fouling, erosive, corrosive and condensable substances. The inlet syngas temperature can be up to about 1600° C. and, after cooling in multiple stages, the exit syngas temperature can be below about 300° C.

The multistage cooling can be accomplished with the cooler operating up to about 1000 psi with a circulating bed of solids containing particles in the range of 50 to 1000 µm.

The multistage cooling can be accomplished with a single multistage cooler capable of handling syngas flow rates up to 90 actual cubic meters per second.

The multistage cooling can be accomplished with syngas superficial velocities up to 10 meter per second through the cooler.

The multistage cooling can lead to steam generation at different steam conditions including superheated steam. One or more stages can also function as an economizer.

The particles in the cooler can agglomerate and grow to relatively larger sizes with entrained fouling substances such as molten ash droplets in the inlet syngas stream and such larger agglomerated particles are periodically withdrawn from the cooler and a portion of pulverized agglomerated ash particles in 200 to 400 µm mean size range are added back to the cooler to maintain inventory.

The heat transfer surfaces can be protected from fouling, erosive and corrosive substances in the syngas as the heat energy is extracted and transferred indirectly from the hot syngas to cooling surfaces with the circulating bed of solid particles in the cooler.

A 50 volume percent stream of oxygen along with steam and carbon dioxide can be injected into the fluid bed of solids at the inlet of the cooler to preferentially and partially oxidize the tar component in the syngas.

In another exemplary embodiment, the multistage syngas cooler is an externally circulating fluidized bed multistage cooler for cooling the high temperature syngas from a coal gasifier comprising a dense fluid bed with imbedded cooling coils in fluid contact with an inlet hot syngas stream, a riser from which a portion of circulating bed of solids enter fluidized bed coolers at different elevations and the cooled solids flow back under gravity to the riser at a lower elevation and the vent gas from the cooler flows to the riser at a higher elevation, a cyclone to disengage syngas and solids with the cooler syngas exiting the syngas cooler, a downcomer to return the cooler solids from the cyclone back to the riser, and fluidizing gas to lower portion of downcomer and dense fluid bed to segregate solids and facilitate removal of agglomerated ash.

The hot syngas entering the cooler can be cooled in successive steps as it flows through the riser portion of the cooler; first, by contacting the solids in dense fluid bed, then by contacting circulating bed of solids at the bottom of the riser and, finally, by contacting cooler solids in riser that return from fluid bed coolers in successive stages.

In another exemplary embodiment, the multistage syngas cooler is an internally circulating fluidized bed (ICFB) multistage cooler for cooling the high temperature syngas from a coal gasifier comprising a dense fluid bed with imbedded cooling coils in fluid contact with an inlet hot syngas stream and multiple stages of internally circulating fluidized bed coolers in series.

The syngas can be successively cooled in different stages to temperatures appropriate for generating desired steam and hot boiler feedwater conditions with heat transfer surfaces imbedded in fluidized and internally circulating beds.

The ICFB cooler can comprise a riser where the syngas mixes and transfer heat energy to circulating bed of solids, a disengagement section to disengage the syngas from circulating bed of solids, an annular space for circulating solids to flow down and transfer heat to imbedded heat transfer surfaces, an aeration and seal mechanism to control flow of circulating solids into riser section, and a cone section that facilitates internal solids circulation and serves as a partition between cooler stages. The cone section can further comprise steam cooled coils with small openings for a small portion of syngas to pass through and provide aeration for solids in annular space.

The syngas entering the cooler can be precooled and treated for fouling agents in an upstream stage and forming a hybrid cooler system with both external and internal circulation of solid particles.

The upstream stage can comprise an eductor to inject relatively cooler solids from last stage of multistage ICFB syngas cooler into a downflow cooler where the hot syngas inlet stream initially mixes with the injected relatively cooler solids, a high pressure recycle syngas stream as the eductor motive fluid, and a relatively cooler syngas exit stream from the downflow cooler that enters the multistage ICFB syngas cooler for further cooling.

The upstream stage can be a downflow cooler system that comprises a downflow conduit wherein the hot inlet syngas as it flows down mixes with relatively cooler solids injected at different elevations, a Presalter cyclone to disengage the syngas from agglomerated solids, a cooler with imbedded heat transfer surfaces to cool the disengaged solids from cyclone with provision for withdrawal of agglomerated solids exceeding 1000 µm in size and addition of make-up solids, a lift conduit to lift the cooled solids from the cooler with high pressure recycle syngas and inject into the downflow conduit at different elevations, and a relatively cooler syngas exit stream from the cyclone that enters the multistage ICFB syngas cooler for further cooling.

In another exemplary embodiment, the present invention is a circulating fluidized bed syngas cooler system comprising a syngas inlet stream, circulating heat transfer media, a heat removal mechanism, and a syngas outlet stream, wherein at least a portion of the circulating heat transfer media transfers at least a portion of the heat from the syngas inlet stream to the heat removal mechanism such that the temperature of syngas outlet stream is at least 500° C. cooler than the temperature of syngas inlet stream when operating at a syngas flow rate of approximately 90 $m^3/s$.

On the upper end of cooling capacity when operating at high syngas inlet temperatures, the temperature difference between the syngas inlet stream and the syngas outlet stream can be up to 1300° C. at a syngas flow rate of approximately 90 $m^3/s$. The system can operate up to approximately 1000 psi. The circulating heat transfer media can comprise solids having a mean particle size of between approximately 50 to 1000 µm. The syngas superficial velocity can be approximately 10 m/s.

The heat removal mechanism can comprise heat transfer tubes or coils. The heat removal mechanism can generates steam and/or superheated steam.

Circulating heat transfer media comprising an exiting mean particle size or greater can be removed from the system. The exiting particles comprise at least 1000 μm in size. At least a portion of the transfer media comprising the exiting mean particle size or greater can be removed from the system is reduced in size, and at least a portion of the reduced sized transfer media returned to the system.

The present invention can comprise a circulating fluidized bed syngas cooler system comprising a syngas inlet stream, circulating heat transfer media, at least two fluidized bed coolers, a heat removal mechanism, and a syngas outlet stream, wherein at least a portion of the circulating heat transfer media transfers at least a portion of the heat from the syngas inlet stream to the heat removal mechanism such that the temperature of syngas outlet stream is at least 500° C. and up to 1300° C. cooler than the temperature of syngas inlet stream, wherein the circulating heat transfer media comprises solids having a mean particle size of between approximately 50 to 1000 μm, wherein at least a portion of the transfer media comprising a mean particle size of 1000 μm or greater is removed from the system, and wherein a stream comprising oxygen, carbon dioxide and steam is injected into the syngas inlet stream to preferentially and partially oxidize tar components in the syngas.

The present invention can comprise a multi-stage syngas cooler for cooling high temperature syngas from a coal gasifier, the cooler comprising a dense fluid bed with imbedded cooling coils in communication with a hot syngas inlet stream, a riser from which a portion of a circulating bed of solids enter fluidized bed coolers at different elevations and cooled solids flow back under gravity to the riser at a lower elevation and vent gas from the cooler flows to the riser at a higher elevation, a cyclone to disengage syngas and solids with cooler syngas exiting the syngas cooler, a downcomer to return cooler solids from the cyclone back to the riser, and fluidizing gas to a lower portion of the downcomer and the dense fluid bed to segregate solids and facilitate removal of agglomerated ash.

These and other objects, features and advantages of the present invention will become more apparent upon reading the following specification in conjunction with the accompanying drawing figures.

DETAILED DESCRIPTION OF THE PREFERRED EMBODIMENTS

Figure 1:
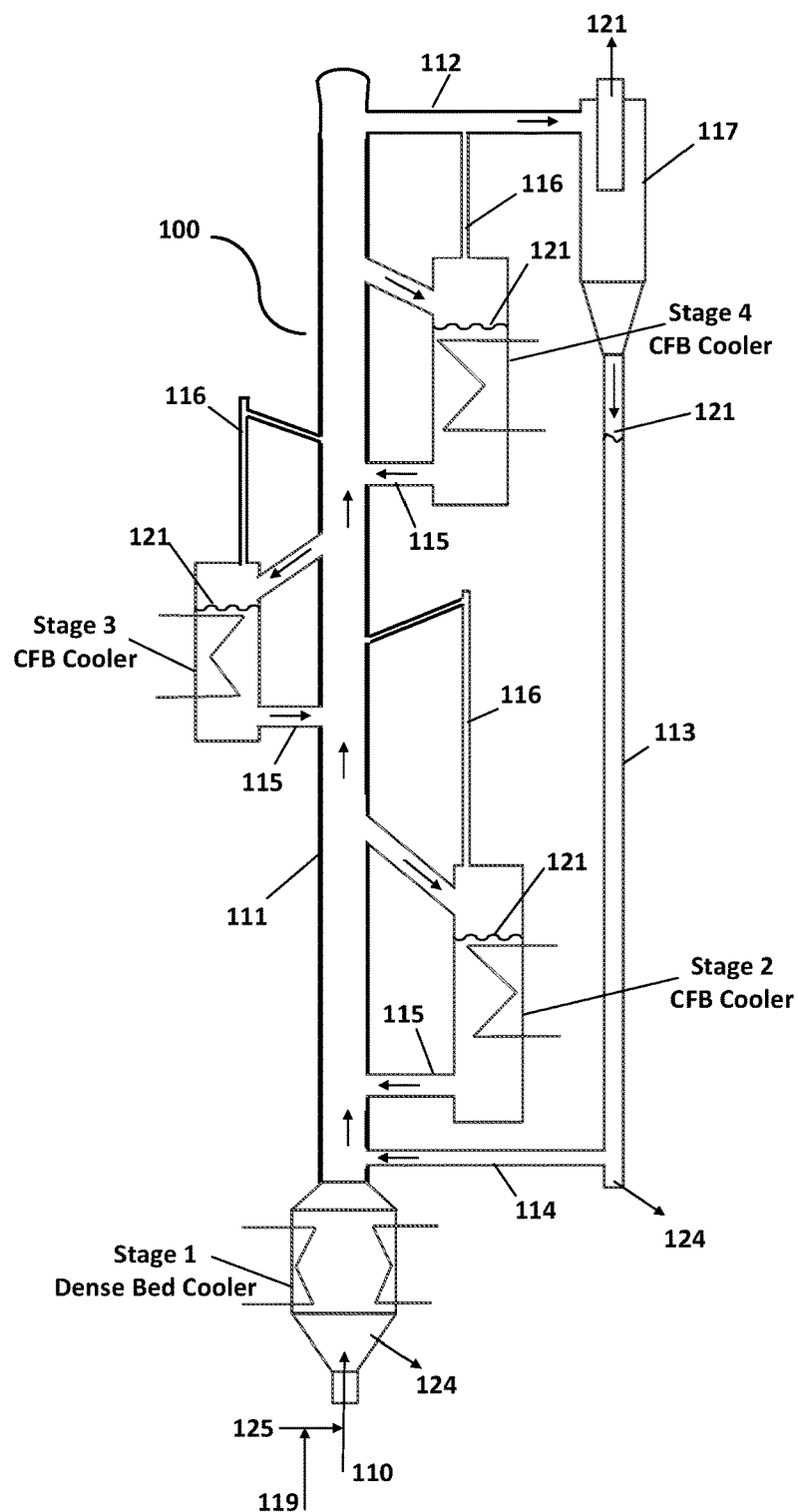
FIG. 1 illustrates a preferred embodiment of an externally circulating multi-stage syngas cooler with a dense bed cooler at the bottom of the riser according to the present invention.

To facilitate an understanding of the principles and features of the various embodiments of the invention, various illustrative embodiments are explained below. Although exemplary embodiments of the invention are explained in detail, it is to be understood that other embodiments are contemplated. Accordingly, it is not intended that the invention is limited in its scope to the details of construction and arrangement of components set forth in the following description or illustrated in the drawings. The invention is capable of other embodiments and of being practiced or carried out in various ways. Also, in describing the exemplary embodiments, specific terminology will be resorted to for the sake of clarity.

It must also be noted that, as used in the specification and the appended claims, the singular forms "a," "an" and "the" include plural references unless the context clearly dictates otherwise. For example, reference to a component is intended also to include composition of a plurality of components. References to a composition containing "a" constituent is intended to include other constituents in addition to the one named.

Also, in describing the exemplary embodiments, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" or "substantially" one particular value and/or to "about" or "approximately" or "substantially" another particular value. When such a range is expressed, other exemplary embodiments include from the one particular value and/or to the other particular value.

Similarly, as used herein, "substantially free" of something, or "substantially pure", and like characterizations, can include both being "at least substantially free" of something, or "at least substantially pure", and being "completely free" of something, or "completely pure".

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a composition does not preclude the presence of additional components than those expressly identified.

The materials described as making up the various elements of the invention are intended to be illustrative and not restrictive. Many suitable materials that would perform the same or a similar function as the materials described herein are intended to be embraced within the scope of the invention. Such other materials not described herein can include, but are not limited to, for example, materials that are developed after the time of the development of the invention.

Depending upon the type of gasifier and fuel characteristics, syngas generated from gasifiers generally has a wide temperature range from approximately 800° C. to 1600° C. To maintain high process efficiencies, it is necessary to recover heat energy from the syngas while simultaneously cooling the syngas for further treatment. In addition to the wide exit temperature range, the gasifier types comprise upflow and downflow gasifiers with syngas exiting from the top or bottom of the gasifier. Both the gasifier and syngas cooler are generally tall vessels with the syngas cooler closely integrated with the gasifier. Depending on the type of gasifier and location and temperature of syngas exiting the gasifier, the components of a multi-stage syngas cooler are arranged in appropriate embodiments to limit structure height, reduce stress load and facilitate better integration.

Various embodiments of the multi-stage syngas cooler system are illustrated in FIGS. 1-4. The present syngas coolers preferably can handle syngas containing one or more fouling, erosive and corrosive substances up to approximately 1000 psi. The preferred syngas coolers can provide approximately at least 500° C. and up to 1300° C. in cooling, and more preferably handle syngas inlet temperatures up to approximately 1600° C. and are capable of cooling the syngas to below approximately 300° C.

The configuration of the multi-stage syngas cooler 100 of FIG. 1 is mainly applied to syngas generated from downflow entrained flow gasifiers, where a portion of the coal ash is melted into molten ash droplets. In current practice with these types of gasifiers, the entire syngas generated and the molten ash droplets typically flow co-currently downward through a radiant syngas cooler before flowing through a pool of water to solidify a large portion of the molten ash droplets as slag. In the preferred syngas cooler 100, the syngas stream 110 exiting the gasifier with entrained molten ash droplets flows into a stage 1 dense phase fluidized bed cooler S1DBC, or dense bed, that operates in the range of approximately 800 to 900° C. by removing heat from the inlet stream 110 while generating steam. Due to high bed temperatures and limitations on heat transfer surfaces, steam is typically generated in stage 1 cooler.

Fluidized beds comprise heat transfer media. In preferred embodiments, the heat transfer media comprises inert solids in the form of fluidizable particles, although other/additional phases of media can be used. The dense phase fluidized bed S1DBC is in fluid communication with a circulating fluidized bed. Molten ash droplets in the inlet stream 110 condense and agglomerate on to the heat transfer media of the dense phase bed and circulating loop.

In an exemplary embodiment, the heat transfer media comprises particles, and the initial particle size is in the range of approximately 200 to 400 microns (μm). During operation, the bed particle size distribution can be in the range of approximately 50 μm to 1000 μm as the circulating bed will entrain a portion of the fines from the inlet gas stream 110 and reach a steady state distribution. With continued operation, a portion of the particles in the dense bed and circulating loop will grow to a substantially larger size than 1000 μm due to the coating of entrained molten ash droplets. These larger particles can be selectively removed from the dense bed and lower portion of the circulating loop through segregation through stream 124. A portion of the particles/solids withdrawn from the cooler can be pulverized to particle sizes in the range of 200 to 400 μm and fed back into the cooler through stream 125 along with the inlet syngas stream 110. The particles fed to the cooler via stream 125 act as an agent for further agglomeration, and maintain the heat transfer media inventory in the cooler.

The syngas and solid particles entrained from the dense phase fluidized bed S1DBC are in the range of approximately 800 to 900° C., and mix with relatively cooler solids flowing around the loop through downcomer 113 and a non-mechanical valve 114 and also with solids exiting a stage 2 cooler S2CFB through its non-mechanical valve 115. The mixed streams flow up the riser 111 and a portion of the solids stream from the riser enters the stage 2 cooler S2CFB. The solids rate through the cooler and the solids level 121 are maintained by controlling aeration to the non-mechanical valve 115 that connects the lower part of the stage 2 cooler S2CFB to the riser 111. The solids stream is cooled while typically generating superheated steam from the stage 2 cooler S2CFB. Stage 2 cooler S2CFB and other coolers in the loop comprise fluidized bed coolers with fluidizing gas venting back into the riser through conduit 116.

Although the vents 116 for each stage of the cooler are shown to flow back into different elevations of the riser 111, it is feasible to practically combine all the vents with the last stage (stage 4 cooler S4CFB) vent and vent to one location in the circulating loop. Further, the solids from upper stages can also be routed to a lower stage to increase the solids flow rates through the coolers so as to improve the heat transfer coefficients in all the coolers.

The syngas and solids stream as it flows up the riser 111 further mixes with the relatively cooler solids stream exiting the stage 3 cooler S3CFB. Again, as with the stage 2 cooler S2CFB, a portion of the relatively heated solids stream enters the stage 3 cooler S3CFB.

The riser in the circulating loop can be designed to operate at a riser velocity (in the range of 4 to 10 m/s) that induces substantial solids reflux along the riser wall that promotes the flow of hot solids into the coolers. Depending upon the gasifier capacity and process needs, the stage 3 cooler S3CFB can be a superheater or an economizer. The features and operation of the stage 3 cooler S3CFB can be similar to the stage 2 cooler S2CFB. The process is repeated with the stage 4 cooler S4CFB that is typically an economizer. Thus, the syngas is cooled progressively as it flows through the dense bed and along the riser as heat is transferred to each stage of multi-stage syngas cooler with the circulating bed of solid particles.

The cooled syngas and solids stream from the riser flows through a cross-over 112 to a cyclone 117. The solids are separated from the syngas stream in the cyclone and flows to the downcomer 113 completing the circulating loop. The cooler syngas exits the circulating loop through stream 121. The larger solid particles from the circulating loop can be withdrawn from the bottom of the downcomer through stream 124 by segregating the solids using fluidizing gas. The solids level 121 in the downcomer 113 is maintained with make-up solids stream 125 and solids withdrawal through stream 124. Thus, with staging, the syngas can be effectively cooled from inlet temperatures of up to 1600° C. to below 300° C. for further treatment downstream while at the same time generating steam at different conditions in various cooler stages as well as hot boiler feed water in a last cooler stage.

The syngas cooler illustrated in FIG. 1 can also be used to cool syngas containing substantial amounts of tar. In order to avoid tar condensation onto the particle surfaces in later cooler stages and downstream equipment, a carrying gas can be injected to increase the syngas temperature. For example, an oxygen stream 119 with an oxygen concentration up to 50 volume percent can be injected into stream 125 as additional carrying gas (with $CO_2$ and steam being the preferred remaining 50 volume percent gas) so as to increase the syngas temperature to destruct the tar components at the inlet section of the syngas cooler. The oxygen thus injected is in proportion to achieve complete partial oxidation of tar components in the syngas.

In such a partial oxidation of organic hydrocarbons constituting tar, the necessary increase in gas temperature is dependent upon the requirements for the hydrocarbon destruction, and not upon the limitation of the ash fusion temperature.

It is believed that the maximum temperature can reach approximately 1150° C. to completely destruct most if not all of the tar in the syngas when gasifying biomass or bituminous coals in a fluidized bed gasifier. Even if it is necessary to increase the syngas temperature above the ash fusion temperature, the entrained small ash particles, if fluid, will likely coat the inert circulating solid particle surfaces in the cooler. In such an embodiment, as the oxygen stream 119 is injected with steam and $CO_2$ and make-up solids stream 125, the oxygen is well dispersed along with the incoming syngas stream 110 and minimizes the potential for hot spots. As the tar and some char particles in the syngas are preferentially and partially oxidized at a relatively high temperature, the main partial oxidation product is CO instead of $CO_2$. The hot syngas can be immediately quenched in the first-stage cooler to a temperature in the range of approximately 800° C. to 900° C.

The syngas cooler 200 of FIG. 2 comprises a dense bed cooler and a series of ICFB coolers to generate steam at different conditions and heat the boiler feed water while cooling the syngas from up to approximately 1600° C. to below approximately 300° C. The syngas stream 210 exiting the gasifier flows through conduit 220 into a dense phase fluidized bed cooler S1DBC that operate in the range of approximately 800 to 900° C. The stage 1 dense bed cooler S1DBC with imbedded cooling coils 222 typically generates steam due to high bed temperatures and temperature limitations of heat transfer surface materials. If syngas contains a tar component, an oxygen stream 219 containing up to 50 volume percent oxygen mixed with steam and $CO_2$ can be injected at the inlet of the stage 1 dense bed cooler S1DBC to preferentially and partially oxidize tar and some char particles in the syngas.

The initial size of particles in all stages of the syngas cooler 200 is preferably in the range of 200 to 400 μm. With continued operation, a portion of particles in the dense bed grow to larger sizes due to agglomeration with fouling material in the syngas. Particles larger than approximately 1000 μm can be withdrawn through stream 224 and make-up solids added back to the cooler through stream 225. Make-up inert solid particles in the size range 200 to 400 μm are preferably derived from pulverizing a portion of the larger size agglomerated particles withdrawn from the cooler through stream 224. With these large size make-up inert solid particles, the disengagement section 238 in stage 2 ICFB cooler S2ICFB is highly efficient and virtually captures all the particles from the riser 236 and returns the particles to the cooling section 234.

The syngas at 800 to 900° C. exits stage 1 dense bed cooler S1DBC and flows to the stage 2 ICFB cooler S2ICFB that is an internally circulating fluidized bed cooler. The syngas exiting the stage 1 dense bed cooler S1DBC mixes with stage 2 cooler S2ICFB circulating solids stream 227. The syngas is cooled to approximately 650° C. to 700° C. by transferring heat to the solids stream as the mixture flows up the riser 236. The gas and solids are disengaged with the aid of an inertial disengager 238. Heated solids flowing down the annular space between the riser and shell of the vessel transfers heat to heat transfer surfaces 234 imbedded in the annular space of stage 2 cooler S2ICFB. Stage 2 cooler S2ICFB is typically a superheater in an IGCC process. The solids circulation stream 227 rate is controlled by aeration gas 226 and a non-mechanical seal mechanism 230. The syngas transfers heat as it mixes with relatively cooler solids in lower part of the riser region 232 very quickly. As a result, the stage 2 cooler S2ICFB height is dependent upon the heat transfer surface area necessary to raise superheated steam at desired conditions.

It is believed that the inertial disengager 238 can have different designs to affect the separation efficiency. One of the designs is a simple Chinese hat, which completely relies on the inertia of the solids after changing direction of flow upon impinging for gas-solids separation. Those skilled in the art can appreciate other designs for effective gas-solids separation such as having a sealed-top riser with the gas and solids stream flowing tangentially around the cylindrical shape of the separator. The separator will essentially be in the form of a cyclone and the gas-solids separation is effected by centrifugal forces.

The stage 2 cooler S2ICFB and its operations are separated internally from dense bed stage 1 cooler S1DBC through a cone shaped divider 228 that also facilitates the internal circulation of solids in stage 2 cooler S2ICFB. The divider 228 is further made up with steam coils with small openings or crevices for a small portion of the syngas from stage below to flow through (stream 226) and serve as aeration for the solids in the annular space. As the stage 1 cooler S1DBC does not contain a disengagement section, the solids inventory is maintained by transferring stage 2 cooler S2ICFB solids through conduit 229. Overall solids inventory in cooler stages 1 and 2 as well as in cooler stages 3 S3ICFB and 4 S4ICFB and the solids level 221 in each stage are maintained by adding make-up solids through stream 225 to each stage as necessary.

The disengaged syngas from the stage 2 cooler S2ICFB flows to stage 3 cooler S3ICFB and stage 4 cooler S4ICFB where the syngas is further cooled to desired temperatures before exiting the syngas cooler through exit stream 250. Depending upon the capacity of the IGCC process, the stage 3 cooler S3ICFB can either be a superheater or an economizer and stage 4 cooler S4ICFB can be an economizer. Both S3ICFB and S4ICFB are ICFB coolers and their features and functional and operational characteristics are similar to the stage 2 cooler S2ICFB. In the ICFB coolers, the syngas does not come in direct contact with the heat transfer surfaces imbedded in the annular space between the riser and vessel shell. This alleviates erosion, corrosion and fouling of heat transfer surfaces due to substances that may be present in the syngas. The circulating solids stream flows down the annular space at approximately 1 to 1.5 m/s, and at such low velocities does not cause erosion of heat transfer surfaces.

Figure 2:
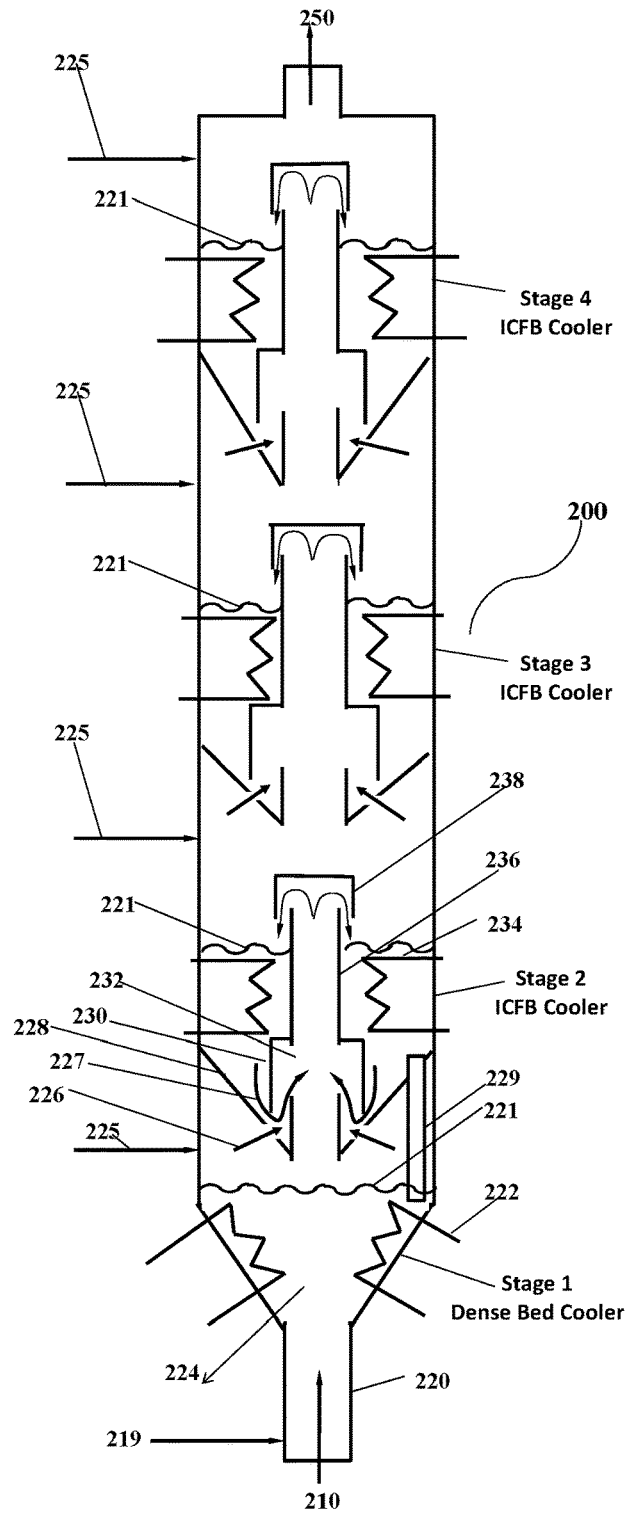
FIG. 2 illustrates a multi-stage internally circulating fluid bed syngas cooler with a dense bed cooler at the inlet section according to a preferred embodiment of the present invention.
Figure 3:
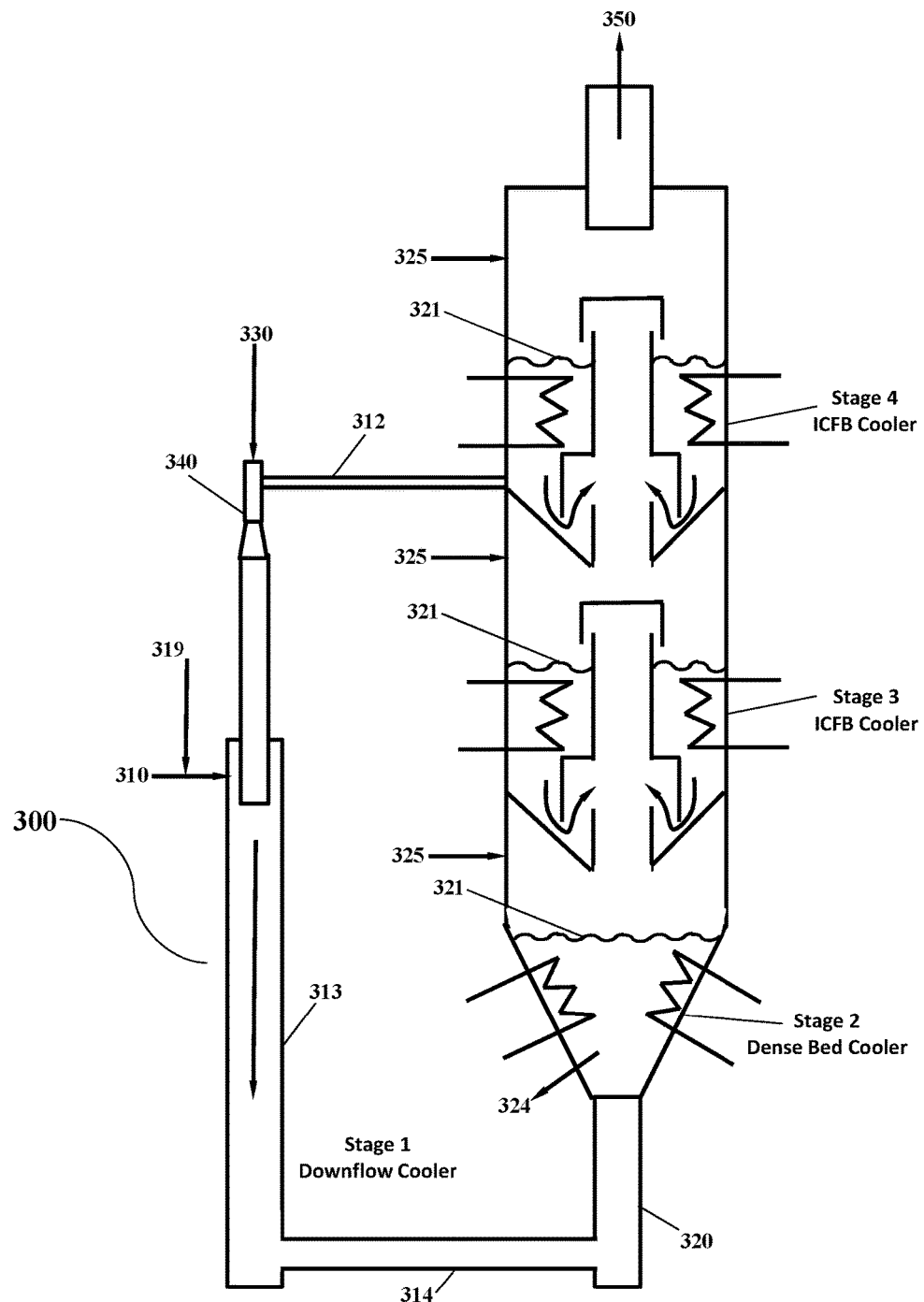
FIG. 3 illustrates a hybrid cooler with a downflow cooler and a multi-stage internally circulating fluid bed syngas cooler according to a preferred embodiment of the present invention. In this cooler embodiment, the downflow cooler stage withdraws cooled solids from the last stage of the cooler through an eductor and injects the cooler solids into the downflow cooler.
Figure 4:
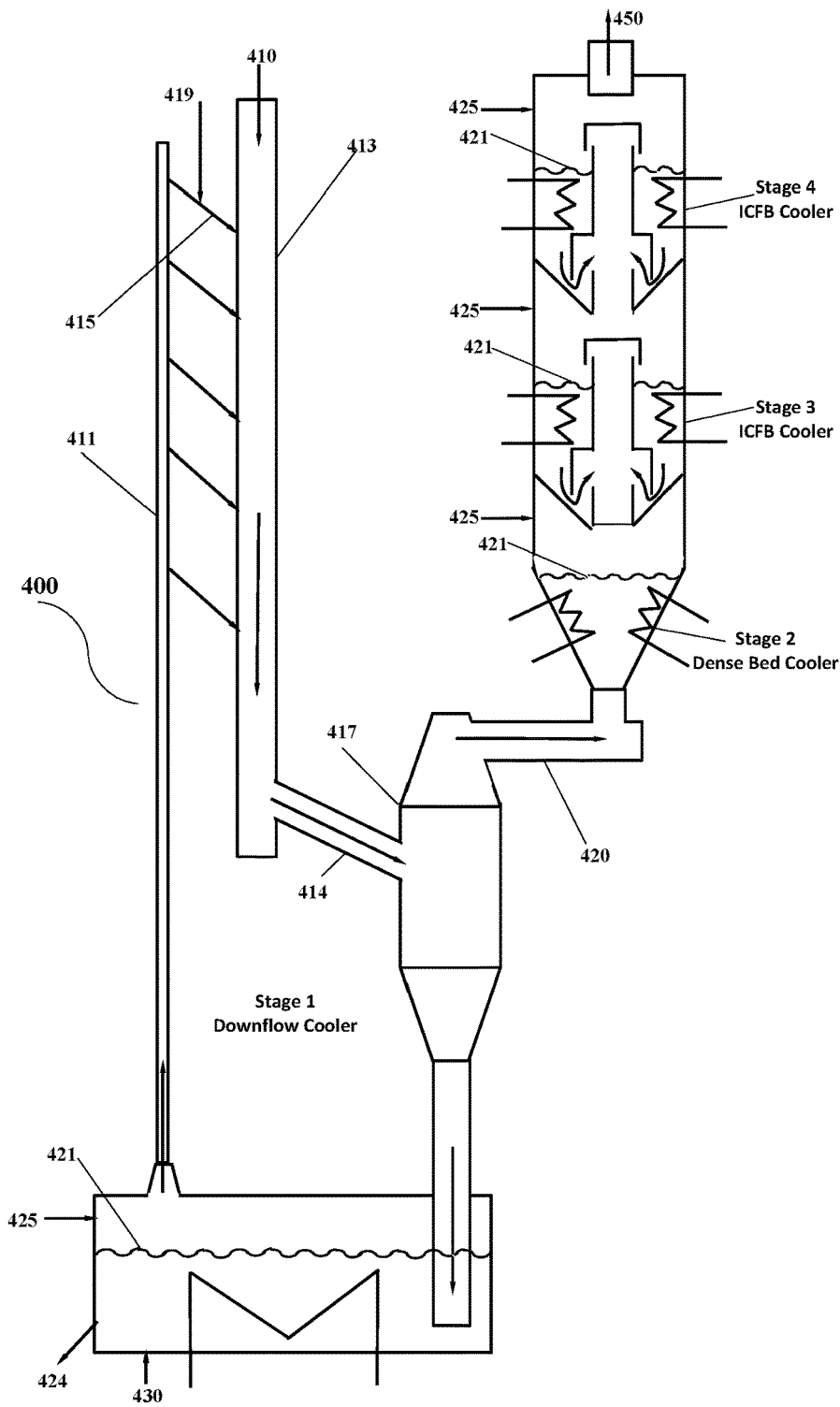
FIG. 4 illustrates another embodiment of a hybrid cooler comprising an independent external solids circulating loop as a downflow cooler and a multi-stage internally circulating fluid bed cooler according to a preferred embodiment of the present invention.

Other embodiments of multi-stage syngas cooler are disclosed in FIGS. 3 and 4 that are hybrids of embodiments of those systems of FIGS. 1 and 2 and serve specific process for better integration with gasifier, general arrangement and layout needs of a gasification process. These hybrid multi-stage coolers can be used with gasifiers that have syngas exit located near the top of the gasifier and with syngas having high concentration of fouling substances and high temperatures approaching 1600° C.

The last two digits of various reference numbers designated in FIGS. 3 and 4 have either similar identifying components, streams or functionality as in FIGS. 1 and 2. The factors differentiating the embodiments in FIGS. 3 and 4 from FIGS. 1 and 2 are described below.

The embodiment 300 disclosed in FIG. 3 uses cooler solids from stage 4 ICFB cooler S4ICFB through conduit 312 to initially contact the hot syngas stream 310. As solids from stage 4 ICFB cooler S4ICFB are relatively at a lower pressure compared to inlet syngas stream, an eductor 340 with high pressure recycle syngas 330 boosts the pressure and facilitates solids injection. If the syngas contains tar from a fluidized bed for example, the hot syngas and the solids stream is initially contacted with a dilute oxygen stream 319 to preferentially and partially oxidize the tar components in the syngas. The relatively cooler educted solids mixes with hot syngas as both streams flow down the stage 1 downflow cooler 313 before entering the stage 2 dense bed cooler S1DBC through conduit 320 where the solids exchange heat with imbedded heat transfer surfaces to generate steam. The arrangement, function and operation of stage 2 dense bed cooler S1DBC and stages 3 and 4 ICFB coolers are similar to the description of corresponding coolers of embodiment 200 disclosed in FIG. 2. The syngas is successively cooled in each stage before exiting through stream 350. The solids level 321 in each of the last three stages of embodiment 300 is maintained by withdrawal of oversized agglomerated solids stream 324 from the stage 2 dense bed cooler and the addition of make-up solids through stream 325. The make-up solids in the size range approximately 200 to 400 µm are derived from pulverizing agglomerated solids.

The embodiment 400 shown in FIG. 4 provides more flexibility in cooling the syngas as it comprises an independent stage 1 circulating downflow cooler. The hot syngas inlet stream 410 with fouling substances mix with cooler solids stream 415 injected at various elevations and both streams flow down and through an inclined conduit 414 enter a Presalter cyclone 417 as disclosed in U.S. Pat. No. 7,771,585, incorporated herein in full by reference. A dilute oxygen stream 419 as in embodiments in FIGS. 1 to 3 is injected along with stream 415 at upper elevation of conduit 413 to preferentially and partially oxidize tar component that may be present in the syngas.

As the syngas and relatively cooler solids stream mix and flow down the conduit 413, molten ash droplets in the syngas condense and agglomerate with the injected cooler solid particles. The solids stream from the cyclone is cooled in the stage 1 cooler by exchanging heat with heat transfer surfaces and generating steam. Recycle syngas at higher pressure injected into the cooler through stream 430 lifts the solids from the cooler through conduit 411 for reinjection. Oversize agglomerated solids are withdrawn from the stage 1 cooler through stream 424 and make-up solids in the particle size range of approximately 200 to 400 µm, derived from pulverizing agglomerated solids, are added back to the cooler through stream 425.

The syngas stream 420 exiting the cyclone enters the stage 2 dense bed cooler and stages 3 and 4 ICFB coolers for further cooling before exiting the multi-stage fluid bed cooler embodiment 400 through stream 450. The arrangement, function and operation of stage 2 dense bed cooler and stages 3 and 4 ICFB coolers are similar to the corresponding coolers described of embodiment 200 disclosed in FIG. 2. Solids level 421 in the stage 1 downflow cooler and stages of the embodiment 400 are maintained as necessary through solids addition to each stage with stream 425 and oversize solids withdrawal through stream 424. As the stage 1 downflow cooler operation is independent of other stages, the embodiment of FIG. 4 provides more flexibility in operation and cooling capacity and can handle syngas with high inlet temperatures up to approximately 1600° C.

As with other embodiments, the syngas as it flows through embodiments 300 and 400 disclosed in FIGS. 3 and 4 does not directly contact the heat transfer surfaces, and thus avoids difficulties associated with corrosion, erosion and fouling. Further, the multiple cooling stages with circulating bed of solids in these embodiments facilitate generation of hot boiler feed water and steam at different conditions including superheated steam necessary for an IGCC process to generate power.

As heat transfer surfaces are protected from high inlet temperatures as well as corrosive, erosive and fouling characteristics of syngas, various embodiments of the multi-stage syngas cooler disclosed herein can be operated at high superficial gas velocities in the range of approximately 4 to 10 m/s that facilitates a single multi-stage syngas cooler to handle syngas flow rates up to 90 $m^3$/s which is larger than any single gasifier can deliver.

Numerous characteristics and advantages have been set forth in the foregoing description, together with details of structure and function. While the invention has been disclosed in several forms, it will be apparent to those skilled in the art that many modifications, additions, and deletions, especially in matters of shape, size, and arrangement of parts, can be made therein without departing from the spirit and scope of the invention and its equivalents as set forth in the following claims. Therefore, other modifications or embodiments as may be suggested by the teachings herein are particularly reserved as they fall within the breadth and scope of the claims here appended.

What is claimed is:

1. A multi-stage syngas cooler system comprising:
   a dense fluid bed with a cooling system in communication with an inlet syngas stream; and
   stages of internally circulating fluidized bed coolers in series, each internally circulating fluidized bed cooler comprising:
   a riser configured to mix syngas with solids from a circulating bed of solids, transferring heat from the syngas to at least a portion of the circulating bed of solids;
   a disengagement section configured to disengage at least a portion of the syngas from at least a portion of the circulating bed of solids;
   an annular space defined exterior the riser configured to enable at least a portion of the circulating bed of solids to flow down from the disengagement section; and
   a cone-shaped divider comprising steam-cooled coils with openings configured so at least a portion of the syngas passes through and provides aeration for at least a portion of the down flowing circulating bed of solids in the annular space, the cone-shaped divider further configured to:
   facilitate circulation of at least a portion of the circulating bed of solids; and
   serve as a partition between successive stages of the internally circulating fluidized bed coolers.

2. The multi-stage syngas cooler system of claim 1, wherein the system is configured to successively cool the syngas in the different stages to temperatures appropriate for generating desired steam and boiler feedwater conditions.

3. The multi-stage syngas cooler system of claim 1, each internally circulating fluidized bed cooler further comprising an aeration and seal mechanism to control flow of at least a portion of the circulating bed of solids into the riser section;
   wherein the annular space is further configured to enable at least a portion of the down flowing circulating bed of solids to transfer heat to imbedded heat transfer surfaces.

4. The multi-stage syngas cooler system of claim 1 further comprising an upstream stage located upstream the dense fluid bed, wherein the upstream stage is configured such that the inlet syngas stream entering the dense fluid bed has been precooled and treated for fouling agents in the upstream stage.

5. The multi-stage syngas cooler system of claim 4, wherein the upstream stage comprises:
   an eductor configured to inject solids from the circulating bed of solids from a last stage of the internally circulating fluidized bed coolers into a downflow cooler configured to mix the inlet syngas stream with at least a portion of the injected last stage solids;
   a recycle syngas stream inlet for introduction of a recycle syngas stream as the eductor motive fluid; and
   a syngas exit stream inlet in the downflow cooler for introduction of a syngas exit stream that enters the multi-stage syngas cooler system for further cooling.

6. The multi-stage syngas cooler system of claim 4, wherein the upstream stage comprises:
   a downflow conduit configured such that within which, syngas mixes with solids from the circulating bed of solids injected at different elevations;
   a Presalter cyclone configured to disengage at least a portion of the syngas from agglomerated solids;
   a cooler with imbedded heat transfer surfaces configured to:
      cool disengaged agglomerated solids from the Presalter cyclone;
      withdraw agglomerated solids exceeding 1000 µm in size; and
      add make-up solids;
   a lift conduit configured to:
      lift solids from the cooler with imbedded heat transfer surfaces with recycle syngas; and
      inject into the downflow conduit lifted solids at different elevations; and
   a syngas exit stream inlet in communication with the Presalter cyclone for introduction of a syngas exit stream that enters the multi-stage cooler system for further cooling.

7. The multi-stage syngas cooler system of claim 1, wherein the system is configured to cool from up to 1600° C. syngas by at least 500° C., when operating at a syngas flow rate of approximately 90 m³/s.

8. The multi-stage syngas cooler system of claim 1, wherein the system is configured to cool from up to 1600° C. syngas by at least 1300° C., when operating at a syngas flow rate of approximately 90 m³/s.

9. The multi-stage syngas cooler system of claim 1, wherein the system is configured to operate up to approximately 1000 psi.

10. The multi-stage syngas cooler system of claim 1, wherein the circulating bed of solids comprises solid particles having a mean particle size of between approximately 50 to 1000 µm.

11. The multi-stage syngas cooler system of claim 1, wherein the system is configured to operate with a syngas superficial velocity up to approximately 10 m/s.

12. The multi-stage syngas cooler system of claim 1, wherein the system is configured to remove from the system circulating solids comprising an exiting mean particle size of 1000 µm or greater; and
   wherein the system is further configured to:
      reduce in size at least a portion of the solids removed from the system; and
      return at least a portion of the reduced sized solids to the system.

13. The multi-stage syngas cooler system of claim 12, wherein the reduced-sized solids have a mean particle size of approximately 200 to 400 µm.

14. The multi-stage syngas cooler system of claim 1, wherein the dense fluid bed comprises at least two inlets:
   a first inlet in communication with the inlet syngas stream; and
   a second inlet in communication with a stream comprising oxygen, carbon dioxide and steam;
   wherein the stream comprising oxygen, carbon dioxide and steam mixes with the inlet syngas stream to preferentially and partially oxidize tar components in the syngas.

15. The multi-stage syngas cooler system of claim 1, each internally circulating fluidized bed cooler further comprising a heat transfer system selected from the group consisting of heat transfer coils and heat transfer tubes.

16. A multi-stage syngas cooler system comprising:
   a dense fluid bed with a cooling system in communication with an inlet syngas stream; and
   internally circulating fluidized bed coolers in series;
   wherein each internally circulating fluidized bed cooler comprises:
      a riser configured to mix syngas with solids from a circulating bed of solids;
      a disengagement section configured to disengage at least a portion of the syngas from at least a portion of the circulating bed of solids;
      an annular space defined exterior the riser configured to enable at least a portion of the circulating bed of solids to flow down from the disengagement section; and
      a cone-shaped divider comprising cooling coils with openings configured so at least a portion of the syngas passes through and provides aeration for at least a portion of the down flowing circulating bed of solids in the annular space, the cone-shaped divider further configured to:
         facilitate circulation of at least a portion of the circulating bed of solids; and
         serve as a partition between successive internally circulating fluidized bed coolers;
   wherein the syngas is successively cooled, first in the dense fluid bed, and then in each of the internally circulating fluidized bed coolers;
   wherein the last of the internally circulating fluidized bed coolers comprises a system-cooled syngas outlet configured through which a system-cooled syngas stream exits the last of the internally circulating fluidized bed coolers; and
   wherein the system is configured such that the temperature of the system-cooled syngas outlet stream is at least 500° C. cooler than the temperature of inlet syngas stream.

17. The multi-stage syngas cooler system of claim 16, wherein the cooling system of the dense fluid bed is selected from the group consisting of heat transfer coils and heat transfer tubes.

18. The multi-stage syngas cooler system of claim 16 further comprising an upstream stage located upstream the dense fluid bed, wherein the upstream stage is configured such that the inlet syngas stream entering the system dense fluid bed has been precooled and treated for fouling agents in the upstream stage, forming a hybrid cooler system with both external and internal circulation of solids, wherein the upstream stage comprises:
- a cyclone configured to:
  - disengage at least a portion of the syngas and solids; and
  - exit at least a portion of the disengaged syngas from the multi-stage syngas cooler system;
- a downcomer configured to return at least a portion of the disengaged solids from the cyclone back to the dense fluid bed; and
- a fluidizing gas inlet configured to introduce a fluidizing gas to a lower portion of the downcomer and the dense fluid bed to segregate solids and facilitate removal of agglomerated ash.

19. The multi-stage syngas cooler system of claim 16, each internally circulating fluidized bed cooler further comprising a heat transfer system selected from the group consisting of heat transfer coils and heat transfer tubes.

* * * * *